United States Patent [19]

Jeannet et al.

[11] 3,981,201

[45] Sept. 21, 1976

[54] ADJUSTABLE METER

[75] Inventors: Jean-Pierre Jeannet, Lausanne; Jean-Pierre Leuba, Renens, both of Switzerland

[73] Assignee: Tesa S.A., Renens, Switzerland

[22] Filed: Jan. 10, 1975

[21] Appl. No.: 540,134

[30] Foreign Application Priority Data

Feb. 15, 1974  Switzerland.......................... 2130/74

[52] U.S. Cl. ................................................ 73/431
[51] Int. Cl.² ........................................ G01D 11/24
[58] Field of Search .......... 73/431; 116/129 A, 130; 324/156; 33/172 B; D10/46, 102; 248/475 B, 483, 27

[56] References Cited
UNITED STATES PATENTS

| | | | |
|---|---|---|---|
| 2,005,792 | 6/1935 | Leins ................................ | 73/431 X |
| 2,124,006 | 7/1938 | Parker ........................... | 33/172 B X |
| 2,464,190 | 3/1949 | Wen ........................................ | 73/431 |
| 2,571,853 | 10/1951 | Fontecchio .................... | 33/172 B X |
| 3,263,503 | 8/1966 | White ..................................... | 73/431 |
| 3,512,746 | 5/1970 | Vitaloni et al. ...................... | 248/483 |
| 3,594,911 | 7/1971 | Sherman et al ...................... | 73/431 |
| D192,939 | 5/1962 | Blowers .............................. | D10/102 |

FOREIGN PATENTS OR APPLICATIONS 1,227,455  8/1960  France ........................... 248/475 B

*Primary Examiner*—Richard C. Queisser
*Assistant Examiner*—Daniel M. Yasich
*Attorney, Agent, or Firm*—Anthony J. Casella

[57] ABSTRACT

A measuring device for measuring dimensions in which an adjustable reading unit giving a numerical or analog display is fitted in a casing intended to be place on a table, a bracket, a work-bench or any other suitable support.

5 Claims, 5 Drawing Figures

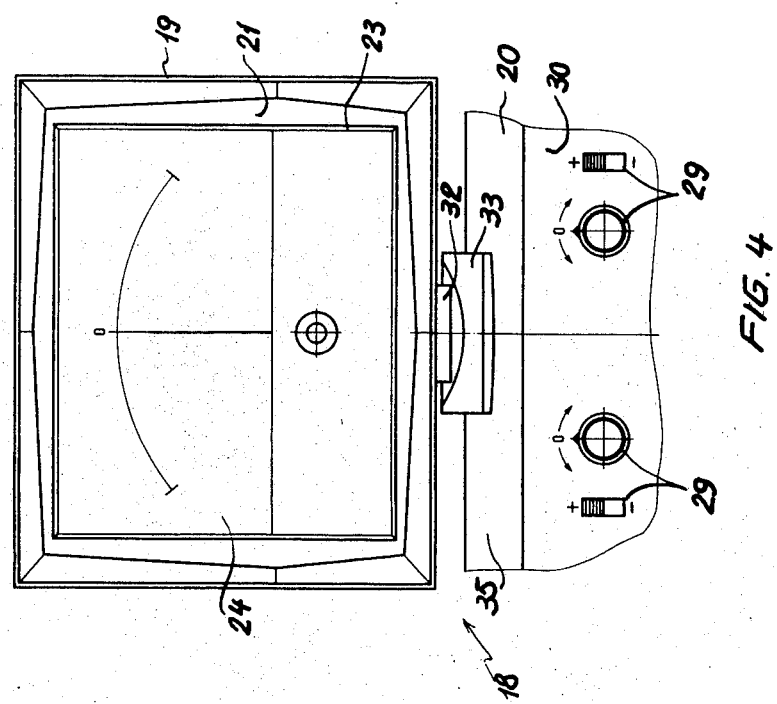
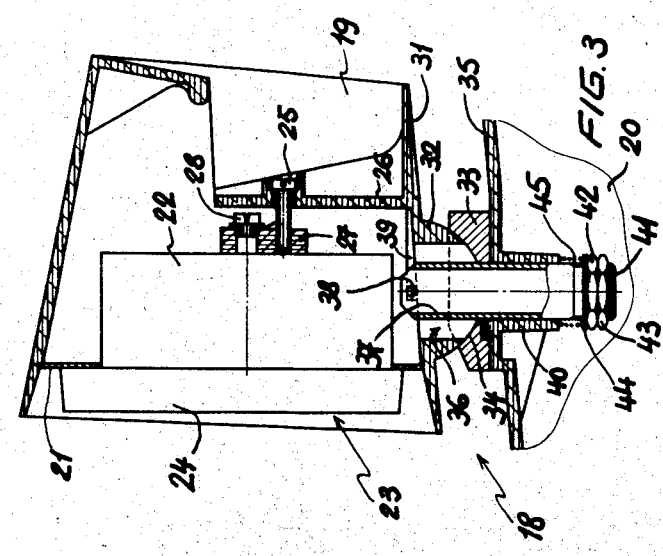
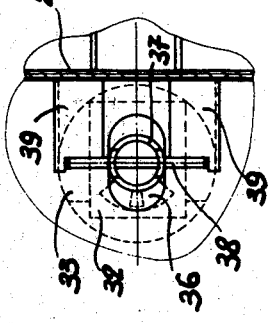

ADJUSTABLE METER

Measuring devices are known, and in particular, devices for measuring dimensions, in which a reading unit giving a numerical or analog display, and intended to be connected to an electronic transducer, is fitted in a casing intended to be placed on a table, a bracket, a work-bench, or any other suitable support. In some instances, the casing containing the reading unit may also comprise accessories such as circuits controlling the reading unit.

These devices may be used alone or in combination with other measurements processing elements, such as elements for the treatment of information supplied to the reading unit these elements being usually located in cases having a shape in general similar to that of the casing containing the reading unit, in which event the said casings may be stacked one upon the other or juxtaposed.

In either of these instances, the casing comprising the reading unit cannot always be placed at a level opposite the user, a feature which makes reading difficult if the user cannot displace himself to come exactly on a level with the reading unit, and this is particularly troublesome when the reading unit gives an analog display or is a meter with a pointer.

According to the present invention there is provided a measuring device in which a reading unit furnishing a numerical or analog display is fitted in a casing, wherein the reading unit may be oriented about a vertical and/or horizontal axis.

The accompanying drawings show, by way of example, two embodiments of the present invention.

FIG. 3 is a side view, partly in section, of a second embodiment;

FIG. 4 is a front view of the second embodiment;

FIG. 5 is a cross-sectional plan view of a detail of FIG. 3.

Figure 2:
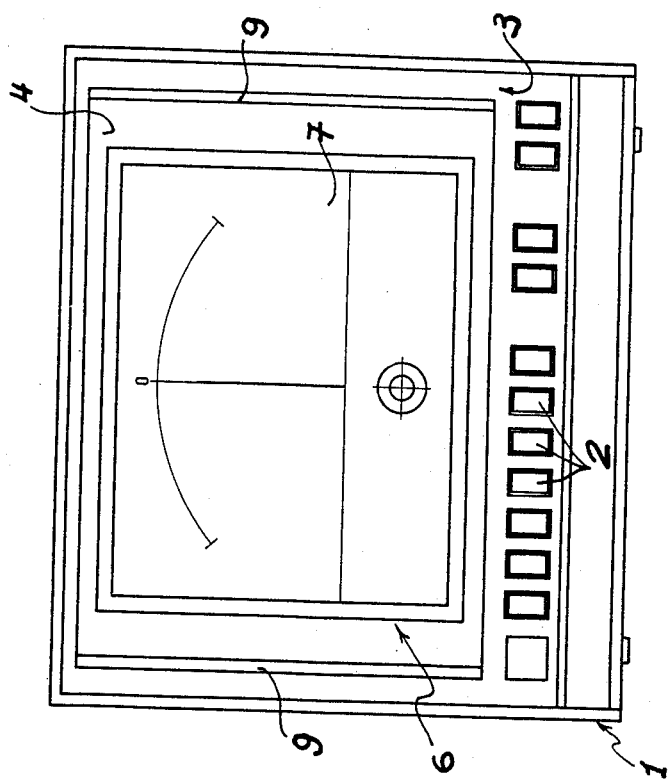
FIG. 2 is a front view of this embodiment.
Figure 1:
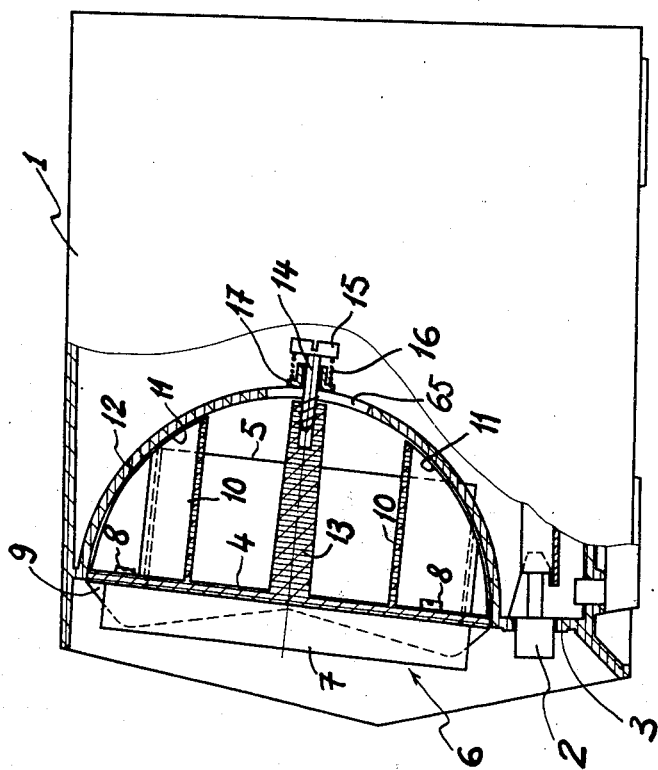
FIG. 1 shows a side view, partly in section, of a first embodiment.

The device shown in FIGS. 1 and 2 comprises a casing 1 in which the various control circuits (not shown) are provided, the control buttons 2 thereof being visible on the front wall 3 of the said casing.

This wall is cut away over a portion of its surface and located in this cut-out portion is a displaceable panel 4 provided with an opening in which the body 5 of a reading unit or meter 6 is located, the dial 7 of said unit being held against the front face of the displaceable panel 4, the body 5 of the said reading unit thus projecting from the rear face of the displaceable panel 4 to extend into the casing 1. The reading unit 6 is secured to the panel 4 by means of screws 8, and the displaceable panel 4 has two wings 9.

On each side of the body 5 of the reading unit 6, the rear face of the displaceable panel 4 carries a pair of projections 10, each of which has a rounded guide surface 11. This pair of rounded guide surfaces bears against a shell 12 having a cylindrical cross-section which extends from the inner face of the front wall 3 within the casing 1. For the sake of clarity, the rounded guides 11 are shown in FIG. 1 with a slight clearance from the shell 12, but, in reality, these guides 11 rest against the shell 12.

Between the projections 10 the rear face of the displaceable panel 4 carries a piller 13. A screw 14, passing through a vertical slot 65 in the shell 12 engages in the end of the pillar and the head 15 of this screw bears against a compression spring 16 concentric with the screw 14 and bearing against a shoe 17 slidable on the screw 14 and against the shell 12. Hence, the displaceable panel 4 and, consequently, the reading unit 6, which is connected thereto, are kept in position in the cut-out portion of the front wall 3 by the simultaneous support of the guides 11 and the slide block 17 against the shell 12.

When a thrust is exerted on the upper or lower part of the wings 9, the displaceable panel 4 pivots as a result of the sliding of the guides 11 and in the shell 12 and the screw 14 in its slot 65. The reading unit 6 may thus be swung up or down about a horizontal axis which is substantially parallel to or coincides with the horizontal axis of the shell 12, a feature which permits orientation of the said reading unit in the vertical direction. The user may then take a precise reading from an ideal angle, even if the casing 1 is not on a level with his vision, as for example, where the said casing forms part of a stack of apparatus. Moreover, the tilt of the reading unit may get rid of troublesome reflections.

Due to the friction of the guides 11 and the slide block 17 against the shell 12, the reading unit remains in the selected position, whatever its direction may be. The tightening or loosening of the screw 14 makes it possible to modify the frictional locating force of the slide block 17 and the guides 11 against the shell 12, and it is thus possible to intensify or relax, as desired, the effort required to tilt the reading unit.

In the embodiment shown, the reading unit 6 gives an analog display, (FIG. 2) but the reading unit may alternatively be of the numerical display type. The invention may be applied to electrically operated reading units, such as, for example, voltmeters or galvanometers or to reading units controlled by fluid means. According to one variant, the cylindrical shell 12 may be replaced by a spherical shell in which rounded quides connected to the displaceable panel slide, this spherical shell making it possible to tilt the reading unit about both vertical and horizontal axes i.e. it can be tilted in any desired direction. In this case, the screw 14, serving to keep the panel displaceable in the shell, no longer slides in a slot, but passes through a circular opening formed in the shell, the slide block 17 being sufficiently large to overlap the opening. Here, again, the user may take a precise reading from the unit at an ideal angle, and in addition to the elimination of troublesome reflections, it may also be possible to eliminate any parallax which may be produced in the case of a pointer display.

The apparatus shown in FIGS. 3 to 5 comprises a casing 18 containing two parts 19 and 20 pivotably connected to each other.

The upper part 19 has its front wall 21 cut away over a portion of its surface and in this cut-out portion is the body 22 of a reading unit 23, the dial 24 of which is applied to the front face of the said front wall, the body 22 of the reading unit extending from the rear face of the front wall 21 to project into the part 19 of the casing 18. The reading unit 23 is fixed in the part 19 of the casing by means of a screw 25, the head of which bears against a wall 26 of the part 19 of the casing, and the shank of which passes through this wall 26 and engages in a block 27 secured by a screw 28 to the rear face of the body 22.

Various control circuits (not shown) are provided in the lower part 20 of the casing 18, the control buttons 29 of which are shown on the front wall 30 of this part 20.

The lower surface of the bottom 31 of the part 19 has a sliding support block 32 with a cylindrical surface, and this support block slides in a guide 33 comprising a recess 34 of corresponding cylindrical shape resting on the upper wall 35 of the part 20 of the casing 18. In the slide block 32 is a passage 36 the shape of which is oblong. A shaft 37 passes through the passage 36, and its upper part engages a pin 38 held between two shoulders 39 of the bottom 31 and on which the upper part can pivot. The lower part of the shaft 37 passes through the guides 33 to rotate in a bearing 40 disposed under the wall 35. The lower end 41 of the shaft 37 extends out of the bearing 40 and carries a nut 42 engaged by a locknut 43 and serving as an abutment for a washer 44 against which a compression spring 45 bears, urging the shaft 37 and thrusting against the rim of the bearing 40. Hence, the part 19 of the casing 18 and, consequently, the reading unit 23 which is connnected thereto, are kept frictionally in position on the lower part 20 of the casing 18.

When it is desired to tilt the reading unit in the vertical direction, it is only necessary to move the part 19 of the casing 18; this movement is possible since the part 19 can pivot relatively to the shaft 37 about the pin 38, and the supporting slide block 32 can slide in its guide 33. In the course of this tilting movement, the part 19 and the part 20 of the casing 18 remain held together since the shaft 37 is retained in the bearing 40 of the part 20 by the nuts 42–43, the washer 44 and the spring 45. Due to the traction exerted by the shaft 37 on the pin 38 under the action of the spring 45, the supporting slide block 32 is located in its guide 33, and when it slides in its guide, this sliding involves a certain amount of friction which makes it possible for the reading unit to remain in a selected vertical position, whatever its direction may be.

When it is desired to rotate the reading unit 23 in a horizontal direction, it is only necessary to pivot the part 19 of the casing 18 with the shaft 37. In this case, the slide block 32 engages its guide 33 which slides over the upper face of the part 20 of the casing 18. In the course of this pivoting movement, the parts 19 and 20 remain connected, due to the retention of the shaft 37 in the bearing 40, and by the traction exerted by the shaft 37 on the pin 38 under the action of a spring 45, the slide block 32 applies the guide 33 against the wall 35, and the sliding of the guide 33 over the wall 35 involves a certain amount of friction which makes it possible for the reading unit to remain in a selected horizonttal position.

The tightening or loosening of the nuts 42–44, modifies the force of the spring 45 and it is possible in this manner, to intensify or relax opposition to movement of the reading unit as desired.

This reading unit may be tilted about both vertical and horizontal axes, so that it can point in any desired direction within limits. The user therefore may take a convenient and precise reading at an ideal reading angle, even if the casing 18 is not on a level with his vision, as for example, when the said casing is located on a stack of devices. Correct orientation of the reading unit makes it possible to eliminate reflections, and parallax which may be produced if the display is of analog form.

The analog reading unit shown may be replaced by a numerical display reading unit, and this embodiment may be used for reading units operated electrically or hydraulically.

What we claim is:
1. An adjustable meter comprising:
   a. a casing formed to be part of a stack of apparatus, said casing having a front wall with a cut-out portion formed in the surface thereof;
   b. at least one shell disposed within said casing, said shell extending from the inner face of the front wall of said casing;
   c. a panel located in said cut-out portion of said front wall, said panel having an opening formed therein and a plurality of projections fixed on its rear face, the ends of said projections shaped to form rounded guides bearing and sliding against said shell to allow swinging movement of said panel about a horizontal and/or vertical direction within said cut-out portion of said front wall;
   d. means cooperating with the shell and the panel for maintaining said rounded guides against said shell to maintain said panel in a selected position; and
   e. a reading unit connected to said panel within the opening thereof, said reading unit having a dial applied against the front face of said panel and a body passing through said opening in said panel to extend from the rear face thereof and project into the casing, whereby swinging of said panel permits orientation of the reading unit in the horizontal and/or vertical direction.
2. An adjustable meter according to claim 1, wherein said shell has a cylindrical transverse cross-section.
3. An adjustable meter according to claim 1, wherein said shell is spherical.
4. An adjustable meter according to claim 1, comprising:
   a. a piller fixed on the rear face of said panel, between said projections on each side of the body of the reading unit, each said pillar extending in the direction of said shell;
   b. a shoe corresponding to each said pillar, said shoes sliding on said shell; and
   c. a holding screw for each said pillar, each of said screws having a shank which extends through said sliding shoe and through an opening in the shell in engage in the end of the corresponding pillar, and a head which bears on said sliding shoe.
5. An adjustable meter according to claim 4, wherein the head of the screw engages the sliding shoe via an elastic element.

* * * * *